US006165592A

United States Patent [19]

Berger et al.

[11] Patent Number: 6,165,592

[45] Date of Patent: Dec. 26, 2000

[54] DOCUMENT WITH DOPED OPTICAL SECURITY ATTRIBUTE, LAYER COMPOSITE FOR MAKING SAME AND TEST DEVICE FOR TESTING THE DOCUMENT FOR AUTHENTICITY

[75] Inventors: Erich Berger, Vienna; Peter Fajmann, Herzogenburg, both of Austria

[73] Assignee: Oesterreichische Nationalbank, Vienna, Austria

[21] Appl. No.: 08/972,809

[22] PCT Filed: Nov. 17, 1993

[86] PCT No.: PCT/AT93/00176

§ 371 Date: Jul. 13, 1995

§ 102(e) Date: Jul. 13, 1995

[87] PCT Pub. No.: WO94/11203

PCT Pub. Date: May 26, 1994

Related U.S. Application Data

[63] Continuation of application No. 08/446,583, filed as application No. PCT/AT93/00176, Nov. 17, 1993, abandoned.

[30] Foreign Application Priority Data

Nov. 18, 1992 [AT] Austria .................................. 2298/92

[51] Int. Cl.$^{7}$ .............................. B32B 5/16; B42D 15/00

[52] U.S. Cl. ......................... 428/195; 428/200; 428/206; 428/209; 428/344; 428/352; 428/457; 428/690; 428/916; 428/41.8; 283/57; 283/86; 283/92; 250/486.1

[58] Field of Search .................................... 428/195, 200, 428/206, 209, 343, 344, 352, 411.1, 457, 690, 41.8, 156, 161, 164, 913, 916; 283/57, 86, 92, 902; 250/486.1; 162/140

[56] References Cited

U.S. PATENT DOCUMENTS

| | | | |
|---|---|---|---|
| 4,014,602 | 3/1977 | Ruell . | |
| 4,151,667 | 5/1979 | Idelson et al. | 40/2.2 |
| 4,677,285 | 6/1987 | Taniguchi . | |
| 4,705,300 | 11/1987 | Berning et al. . | |
| 4,758,296 | 7/1988 | McGrew | 156/231 |
| 5,093,184 | 3/1992 | Edwards | 428/195 |
| 5,851,615 | 12/1998 | Kay | 428/40.1 |

FOREIGN PATENT DOCUMENTS

| | | |
|---|---|---|
| 0 125 060 A2 | 11/1984 | European Pat. Off. . |
| 0 176 403 A1 | 4/1986 | European Pat. Off. . |
| 0 265 323 A1 | 4/1988 | European Pat. Off. . |
| 0 377 160 A1 | 7/1990 | European Pat. Off. . |
| 0 407 615 A1 | 1/1991 | European Pat. Off. . |
| 0 466 119 A2 | 1/1992 | European Pat. Off. . |
| 2 467 089 | 4/1981 | France . |
| 27 54 267 A1 | 6/1978 | Germany . |
| 27 54 267 C2 | 6/1978 | Germany . |
| 34 22 910 C1 | 9/1985 | Germany . |
| 37 41 179 A1 | 12/1987 | Germany . |
| 39 06 695 A1 | 9/1989 | Germany . |
| 629 903 A5 | 5/1982 | Switzerland . |
| 661 602 A5 | 7/1987 | Switzerland . |
| 2 016 370 | 9/1979 | United Kingdom . |
| 2 192 275 | 1/1988 | United Kingdom . |
| 2 240 947 | 8/1991 | United Kingdom . |
| WO 92/10608 | 6/1992 | WIPO . |

OTHER PUBLICATIONS

Patent Abstracts of Japan, Publication No. JP 000595, Publication Date May 93.

Patent Abstracts of Japan, Publication No. JP4191096, Publication Date Jul. 92.

*Primary Examiner*—Marie Yamnitzky

*Attorney, Agent, or Firm*—Herbert Dubno

[57] ABSTRACT

A document, for example a bank note, a check, a credit card, an identification document or a ticket, bears an optical safety mark in the form of a light-reflecting and light-diffracting and/or refracting layer, for example a hologram, an interference layer, a (computer-generated) refracting structure, located on at least parts of the document. The optical safety mark is arranged in a sandwich structure which is fixed to the document by means of an adhesive layer and if required has one or several transparent layers arranged in the sandwich structure. The adhesive layer and/or transparent layer in the sandwich structure is doped with at least one luminescent substance.

7 Claims, 3 Drawing Sheets

DOCUMENT WITH DOPED OPTICAL SECURITY ATTRIBUTE, LAYER COMPOSITE FOR MAKING SAME AND TEST DEVICE FOR TESTING THE DOCUMENT FOR AUTHENTICITY

CROSS REFERENCE TO RELATED APPLICATIONS

This application, Ser. No. 08/972,809 filed Nov. 18, 1997 is a continuation of Ser. No. 08/446,583 filed Jul. 13, 1995 (now abandoned) as a national stage application of PCT/AT93/00176 filed Nov. 17, 1993 and based, in turn, on Austrian National application A2298/92 filed Nov. 18, 1992 under the International Convention.

The invention relates to a document, for example, a bank note, check, credit card, identification document or ticket which has an optical security attribute in the form of a light-reflecting or diffracting and/or refracting layer, for example, a hologram, an interference layer, a (computer-generated) diffraction structure or the like over at least regions of the document, whereby the optical security attribute is provided with doping material and is formed in a foil structure which is applied to the document by means of an adhesive layer and optionally has at least one transport layer in the foil structure.

Further, the invention encompasses a foil structure for producing such documents and which comprises a carrier film and a transfer layer releasable from the carrier film and in which the embossed optical-security attributes forming light-reflecting or diffracting and/or refracting layer, is formed especially as an embossed foil, preferably as a hot-embossed foil, and has on the side of the reflecting layer turned away from the carrier film, an adhesive layer, whereby at least one transparent layer can be arranged in the foil structure.

BACKGROUND OF THE INVENTION

Documents of the kind mentioned initially herein are known especially from Swiss patent 661 602. To produce such value documents, embossed foils, especially hot-embossed foils, can serve as described for example in German patent document 34 22 910 C1.

Known documents or embossed foils have a structure serving as a security attribute above all against color copying and effective in an optical diffraction sense, the optically diffractive, i.e. light-reflecting diffractive and/or refractive structure having the basic advantage that it can be recognized by the unaided eye but also can be machine read. Typical of such structures are those which are applied to bank notes and are, inter alia, kinegrams and pixelgrams. The falsification of such structures is very difficult but nevertheless can be carried out when it is possible to free the structured surface from the document and galvanically reproduce it utilizing the original as a model or to copy it by photographic techniques.

To make documents secure against falsification, the use of luminescent layers in the documents has been proposed. German patent document DE-OS 37 41 179 discloses the use of two security attributes, namely, one embossed in the paper and thus providing a sensible relief, and further, as a second security attribute, luminescent substances upon the crests or in the valleys of the relief. According to German patent document DE-OS 37 41 179 use is made of a transfer band whose layers are applied by an adhesive layer upon the document, the transfer band containing a color layer of a luminescent material but also in addition to this luminescent layer a color pigment layer.

German patent document DE-OS 39 06 695 shows embedding of a strip in a document as a security element. The strip is comprised of a light-permeable plastic foil which is provided with indicia or patterns in the form of recesses whereby additionally luminescent substances are disposed in regions which are equal in coverage to the recesses. In this case, two security elements are provided, namely one formed by the indicia and patterns while the other is formed by the luminescent substances.

German patent document DE-PS 27 54 267 documents with two security attributes and which have luminescent characteristics. By contrast with brilliant surface optical markings, here there are threads, platelets and fibers embedded in the paper.

The state of the art which has become known, can be summarized by saying that it is known to apply luminescent substances on the one hand in use regions of nonoptical features by (partial) printing, coating, embossing or also by transferring strip applications and, on the other hand, in use regions of the optical means (for example reflective grid structure with line counts of about 100/mm and line depths of about μm), for securing documents with surface-covering protective layers.

In earlier thinking with respect to machine detection of optical features generally there has been a concentration upon the closely related optical reading of the grid structure or the information or image content, which has been associated not only with a substantial technological expense for the reading of multidimensional information, but also the effects of damage which can arise in bank note circulation and which can lead to destruction of the structure and requires taking into consideration the disadvantage that unreadability of the authenticity features may arise. Also, corresponding impression falsification of the optical attribute cannot be recognized by such detection.

OBJECTS OF THE INVENTION

The object of the invention is thus to ensure detection of the authenticity of an optical attribute applied to a document by proving its authenticity independently of the presence of any defect, for example, of a hologram grid structure, and thus to so form the optical attribute that a reliable machine detection can be carried out in the high-speed range (10 m/sec) without reading errors and rejections resulting therefrom. Documents should therefore only be rejected as suspect when an imitation of the optical attribute is present or the optical attribute is omitted entirely. By contrast, such documents as may have damaged optical attributes can be guided into a collection stack for unusable documents and thus require no considerable expense in the form of further processing by hand as is usually necessary for rejects.

SUMMARY OF THE INVENTION

These objects are achieved with a document of the type described initially in a surprisingly simple manner when, according to the invention, the adhesive layer and/or transparent layer in the foil structure is doped with at least one luminescent substance. It is thus also possible that, in the adhesive layer and/or transparent layer of the foil structure different luminescent substances are contained. With the configuration of the document according to the invention, a simple and thus exceptionally inexpensive authentication measurement system is enabled and on the other hand a completely negligible rejection rate can be achieved in the machine processing of the documents. In addition, there is the advantage that high quality artisan forgery of the structure of the optical attribute with the intent of deception can be detected mechanically and in the case of bank note forgery these can be detected during the sorting process or by a qualified cashier.

The incorporation of the luminescent substance in the adhesive layer (doping of the adhesive layer) affords the advantage that in the case of efforts to manipulate the optical security attribute, for example efforts to remove it or release it, there always will remain part of the adhesive layer and thus doping material bonded to the document. Furthermore, the adhesive layer with its thickness of about 6 μm is the thinnest layer in the foil structure. Many luminescent materials, as for example, rare earths, are of inorganic nature and must be milled, so that at particle sizes below 5 μm there are luminous characteristics which are significantly diminished or lost.

Many of the luminous pigments which are suitable for circulating bank notes can be made only with particle sizes of about 5 μm with sufficient aging resistance, ultraviolet resistance and chemical resistance. If one is to incorporate such materials in a security layer on a document surface (subsequent application), one must allow for, among other disadvantages, also a reduction in the brilliance of a pointwise thickening of the document or the paper stack which are detrimental to the production process. Because of the expensive process-control technologically required for the adhesive layer, it can be ensured that the luminescent material can be incorporated in a constant layer thickness or with a constant concentration into the optical attribute. The doping material is protected against UV radiation below the metallic reflection. Preferably luminescent substances which are not detectable under normal daylight, but can be detected by the use of a UV lamp or another electromagnetic radiation source of corresponding energy can be used.

The addition of luminescent substances to the transparent layer, and preferably in the adhesive layer, has the advantage over, for example, purely defractive optically effective structures in that the security attribute can also be sensed when the document or the foil structure is highly damaged, e.g. mechanically. To the extent that forger attempts to transfer the diffraction optically effective structure to a falsified value document, the forgery can be nevertheless detected because of the omission of the luminescent characteristic on the forged document in spite of the fact that it has been provided with the original diffraction effective structure.

The admixture of luminescent substances as provided in accordance with the invention to the adhesive layer and/or a transparent layer in the foil structure can be effected practically without any additional cost in the usual finishing of the document or the foil structure and provides a considerable increase to security effect without noticeable additional cost.

Optionally, for security-technology or production technology considerations, the application of the doped adhesive layer can be either applied subsequently to the optical security attribute prefabricated on the carrier film or preliminarily upon the carrier material, especially paper, by the paper manufacturer or the document manufacturer.

When, as is possible further according to the invention, the luminescent substances are provided only in selected regions in the adhesive layer and/or transparent layer of the foil structure, preferably in a determined, advantageously machine-readable pattern, additional security possibilities are afforded because then not only a general admixture of the luminescent substances to the adhesive or transparent layer in the foil structure will suffice, but additionally the luminescent substance must be applied in a fully dominant manner which is only possible by the use of special machines.

Advantageously, the luminescent substances should be fluorescent or phosphorescent, the decision for the use of fluorescent or phosphorescent substances being based upon the purpose. Optionally there is also the possibility of introducing fluorescent and phosphorescent substances together, optionally each of the substances being provided in a determined pattern.

The luminescent substances which have been found particularly suitable for the purposes of the invention are small-band fluorescent substances, for example, from the group of rare earths. Fluorescent substances with emissions closely neighboring the exciting wavelength and thus with equal emission wavelengths are advantageously useful. The provision or omission of such substances can be detected with known measuring instruments with a high degree of precision, whereby the use of luminescent substances which, because of their luminescent characteristics differ slightly from the original substances can be readily determined, above all during the testing of value documents, etc., using radiation devices very exactly matched to the substances to be tested.

With a foil structure according to the invention it is advantageous when the adhesive layer is formed by a hot-melt adhesive which can provide satisfactory adhesion in the usual application process for hot-embossed foils.

The transparent layer in the foil structure is comprised in a foil structure according to the invention, advantageously of a transparent lacquer known per se.

To ensure that the light-reflecting layer which forms the optical security attribute will also reliably reflect the light, it is provided, according to the invention that the reflective layer is formed by a thin metal layer, for example, an aluminum layer, preferably produced by vapor deposition in vacuum.

With a foil structure according to the invention between the carrier film and the transfer layer, a release layer, for example, a wax layer can be disposed.

The subject of the invention is also a test device for documents. This device is comprised of one or more receivers, which can be configured especially as photodiodes, photomultipliers, CD arrays, and can detect emissions which stem from the luminescent substances provided in the document, the excitation of the luminous substances being effected by at least one source, for example, a laser tube, laser diodes, light diodes, luminescent tubes or luminophor tubes, halogen lamps, X-ray tubes, electron-beam tubes as well as radioactive radiators. The test device can be arranged to also scan multiple measuring locations on one and the same document. In such cases, deflecting devices for the exciting and/or received radiation are provided. As deflecting devices, galvanometer mirrors or generally optical scanners can be provided. The emitted radiation can be split by divider mirrors into multiple-measuring channels in which different filters and/or receivers are arranged.

The receiver can be provided with an evaluating device for the signal received by the receiver.

BRIEF DESCRIPTION OF THE DRAWING

Further features, details and advantages of the invention are given in the following description for a preferred embodiment with reference to the drawing.

In the drawing.

SPECIFIC DESCRIPTION

Figure 1:
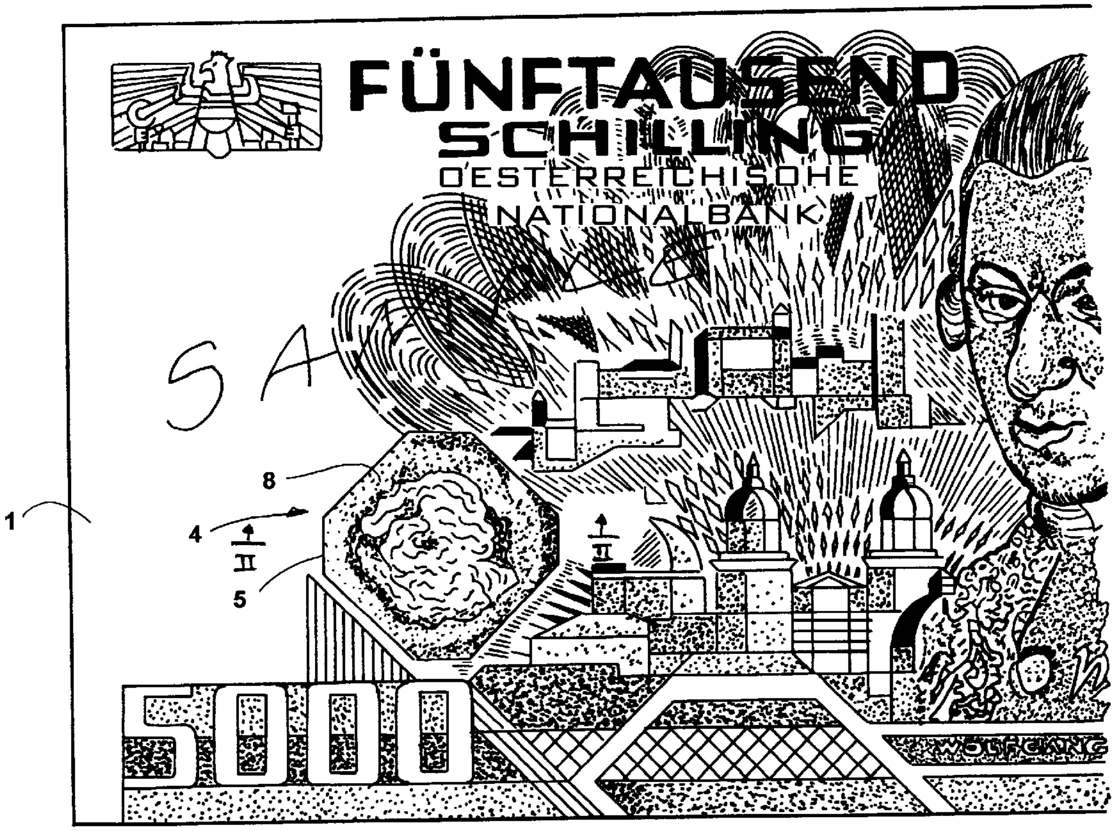
FIG. 1 is a diagrammatic elevational view which shows a value document in the form of a modified Austrian bank note of a value of 5000 Austrian schillings, provided with the features according to the invention.
Figure 3:
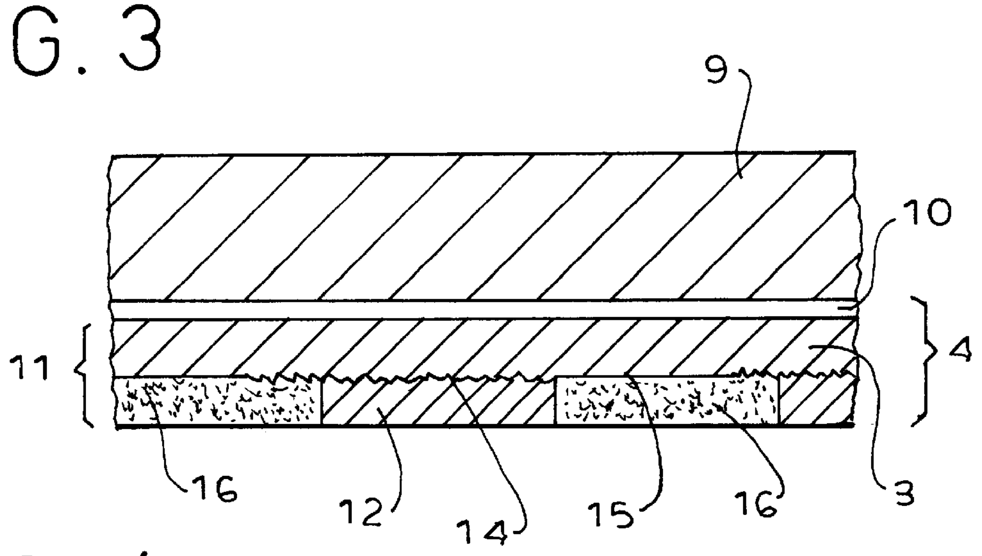
FIGS. 3 and 4 are schematic sections of two different embodiments of an embossed foil.
Figure 4:
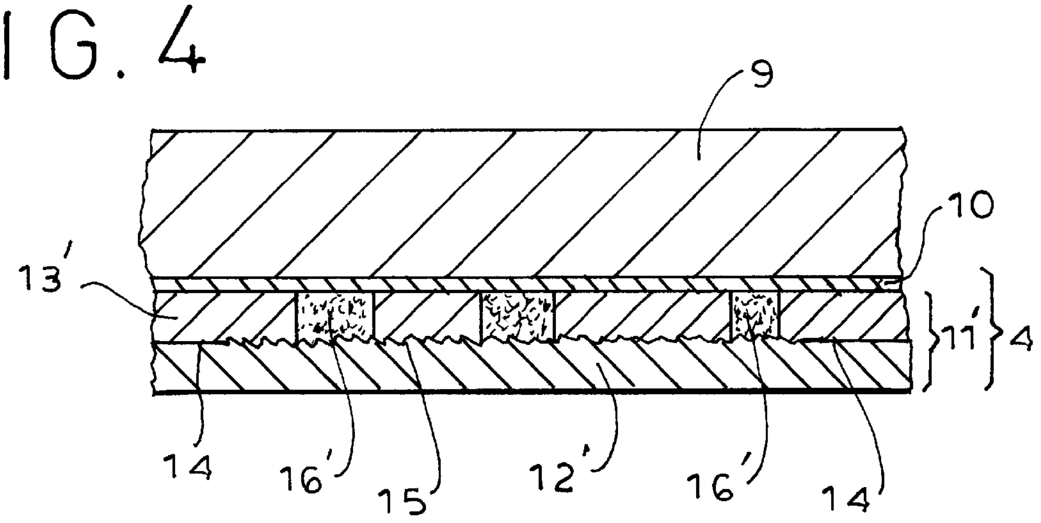

The value document according to FIG. 1 comprises as a carrier 1 a bank note paper although by otherwise formed value documents, the carrier can also be a synthetic paper, a plastic foil or, in the case of a credit card, also a plastic card. A plastic card can carry on its front side, for example in embossed letters, the name of the owner as well as an identification number. The value document 1 comprises a local security attribute which can be provided in the form of a foil structure which is a layer composite 4 as shown in FIGS. 3 and 4 where it is configured as an embossed foil.

Figure 2:
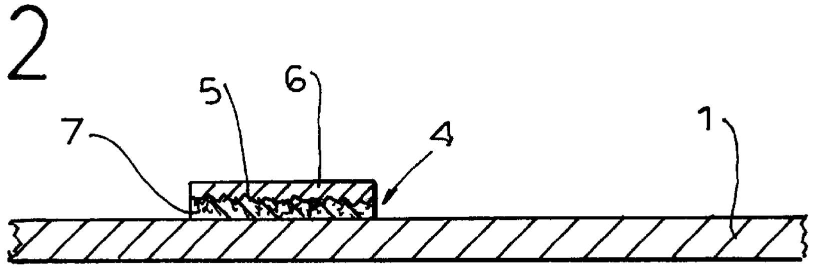
FIG. 2 is a section according to line II—II through the value document according to FIG. 1 to enlarged scale.

In the layer composite 4, an optical security feature, namely, a light reflecting or diffracting and/or refracting structure is provided which is formed for example as a thin metal layer 5 which in the embodiment of FIGS. 1 and 2, is embedded between a transparent layer 6 indicated as the uppermost layer in the layer composite 4, and an adhesive layer 7. The adhesive layer 7 serves to fix the layer composite 4 upon the surface of the document 1. The transparent layer 6 in the layer composite 4, which in the embodiment (FIG. 2) is indicated as the uppermost layer, covers the diffractive optically effective structure formed by the metal layer 5 and makes it considerably difficult to attempt to remove the structure in a counterfeiting effort.

The distinctiveness of the value document according to the invention can be seen in that luminescent substances are provided in the adhesive layer 7. Such substances can also be provided in the transparent layer 6. They can as in the embodiment of FIG. 1, be provided only in regions, namely, the region 8 which in the embodiment shown is a head pattern. The substance which is used can be a composition of small-band fluorescing rare earths.

The security attribute of the value document of FIG. 1 thus not only has the diffractive optically effective and possibly specially shaped structure of the metal layer 5, but additionally includes in the layer composite 4 of the value document regions displaying luminescent characteristics, whereby these characteristics can be detected mechanically and tested by reading devices.

Basically the application of the optical security attributes with luminescing characteristics according to the invention of value documents can be effected in any optional manner, for example, also by applying the layers of the layer composite 4 one after another. It is an important advantage for the layer composite 4 as shown schematically in FIGS. 3 and 4 to be applied on a carrier film 9 and as an embossed foil advantageously as a hot-embossed foil. Such hot-embossed foils can be constructed as described, for example, in the German patent document DE 34 22 910 C1. They comprise a carrier film 9 onto which, through the intermediary of a release layer 10 of wax, the transfer layer indicated in its entirety with 11 or 11' is applied. Upon application of the layer composite 4 to the document 1, the transfer layer 11 or 11' with its surface opposite the carrier film is applied to the document 1 under the effect of heat by pressing, so that the layer composite is bonded to the document 1 by means of adhesive layer 12 or 12'. The carrier film 9 is then directly drawn off which is facilitated by the wax release layer 10.

In the embossed foil shown in FIGS. 3 and 4, the transfer layer 11 or 11' is comprised of an adhesive layer 12 or 12' and a transparent layer 13, 13' in the layer composite. Between the adhesive layer and the transparent layer, a reflecting layer 15 of metal is disposed that at least regionally is diffractive optically effective, i.e. has light refracting or refracting structure 14. For the manufacture of the layer composite 4 (the embossed foil) corresponding to German patent document DE 34 22 910 C1, upon the carrier film 9, firstly the release layer 10 and then the transparent layer 13 or 13' in a layer composite are applied. The surface of the transparent layer 13, 13' turned away from the carrier film 9 is provided with the desired light refracting or diffracting structure 14. The structured surface transparent layer is thereafter metallized to generate the reflecting layer 15, for example by vapor deposition of aluminum in vacuum. The layer composite 4 is then completed by the application of the adhesive layer 12, 12'.

It is also conceivable to provide a simplified embodiment for subordinate uses in which the transfer layer 11 or 11' is comprised of only one layer which simultaneously fulfills the optical as well as the adhesive functions.

In the layer composite 4 according to FIG. 3, luminescent substances are provide in the regions 16 of the adhesive layer 12. The reflecting layer 15 of metal can be interrupted in these regions. There are embodiments possible however in which the carrier 1 is transparent to allow testing for the presence of the luminescent substance from the underside of the carrier, especially when the carrier 1 is a plastic card. For example, in the embodiment of FIG. 1, the luminescent region 16 can also be provided outside the metal layer 5.

According to FIG. 4, the luminescent substances are disposed in the transparent layer 13', for example in regions 16' which correspond in FIG. 1 to the head region 8. It will be self-understood that the luminescent substances can also be provided in the entire transparent layer 13, 13' or the entire adhesive layer 12, 12' which for certain security purposes is altogether sufficient. Furthermore, it can be noted that as luminescent substances, the different substances, for example, fluorescing and phosphorizing substances can also be introduced in different mixtures.

The group of organic luminescent pigments can include practically colorless benzo-oxazine derivatives, typically fluorescing at 545 nm which are marketed by the firm Riedel-de Haen under the designation Lumilux CD 304.

The series of fluorescing substances available in solution, can include a heterocyclic thioxanthene dyestuff marketed by the firm Bayer under the commercial name Macrolex fluorescent red GG.

Rare earths are phosphorescent and display from typical absorption and emission spectra with small-band emission lines. As examples, scandium, yttrium and, from the lanthanides, Europium can be mentioned.

By corresponding mixtures of luminescent substances of mixtures with absorbent substances, doped materials are obtainable which are not luminescent in the visible region of the spectrum. For this purpose different materials are used in which the absorption lines of one overlap the emission lines of the other in the visible region.

Also, there are known fluorescent substances which have their emissions very closely neighboring their excitation wavelength. A special case is that of resonance fluorescence in which the absorption line is identical to the emission line.

Further, luminescent substances can be used in the form or organic semiconductors on the base of conjugated polymers (carbon chains in which the double bonds and single bonds alternate) such as poly-p-phenylene-vinyl, which can be stimulated into electroluminescence by the application of an electrical potential and which can be employed especially for static or quasistatic tests.

Adhesives which contain the luminescent substances can, for example, have the following formulations:

EXAMPLE 1

(Numeral values respectively in parts by weight)

| | |
|---|---|
| Methylethylketone | 250 |
| Toluene | 395 |
| Ethyl Alcohol | 150 |
| Vinyl Chloride - Vinyl Acetate Copolymer (melting point >65° C.) | 110 |
| Unsaturated polyester resin (melting point 100° C.) | 30 |
| Wetting agent (40% in butyl acetate (high molecular weight polymer) | 10 |
| Fillers ($SiO_2$) | 5 |
| Luminescent pigment (Type: Lumilux C, <5 $\mu$; Riedel-de Haen) | 50 |

EXAMPLE 2

(Numeral values respectively in parts by weight)

| | |
|---|---|
| Acetone | 180 |
| Toluene | 70 |
| Ethyl alcohol | 380 |
| Methylmethacrylate/butyl methacrylate (Glass transition temperature Tg = 80° C.) | 60 |
| Ethylmethacrylate Tg = 63° C. | 50 |
| Butylmethacrylate/Methylmethacrylate mixed polymer (40% in xylene) (Tg = 78° C. | 180 |
| Wetting agent (40% in butylacetate) (high molecular weight polymer) | 10 |
| Filler ($SiO_2$) | 10 |
| Luminescent pigment (Type: Lumilux C, <5 $\mu$; Riedel-de Haen | 60 |

Figure 5:
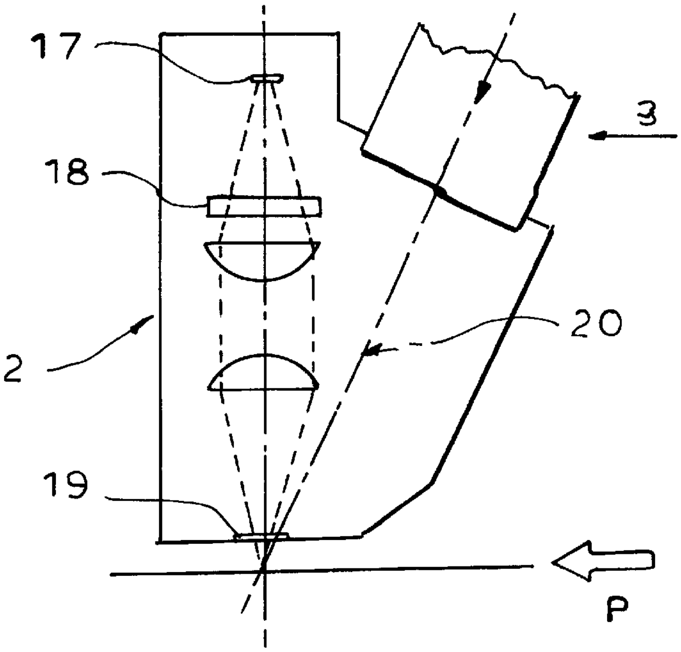
FIG. 5 is a diagram of a luminescent test device for testing with reflected light.
Figure 6:
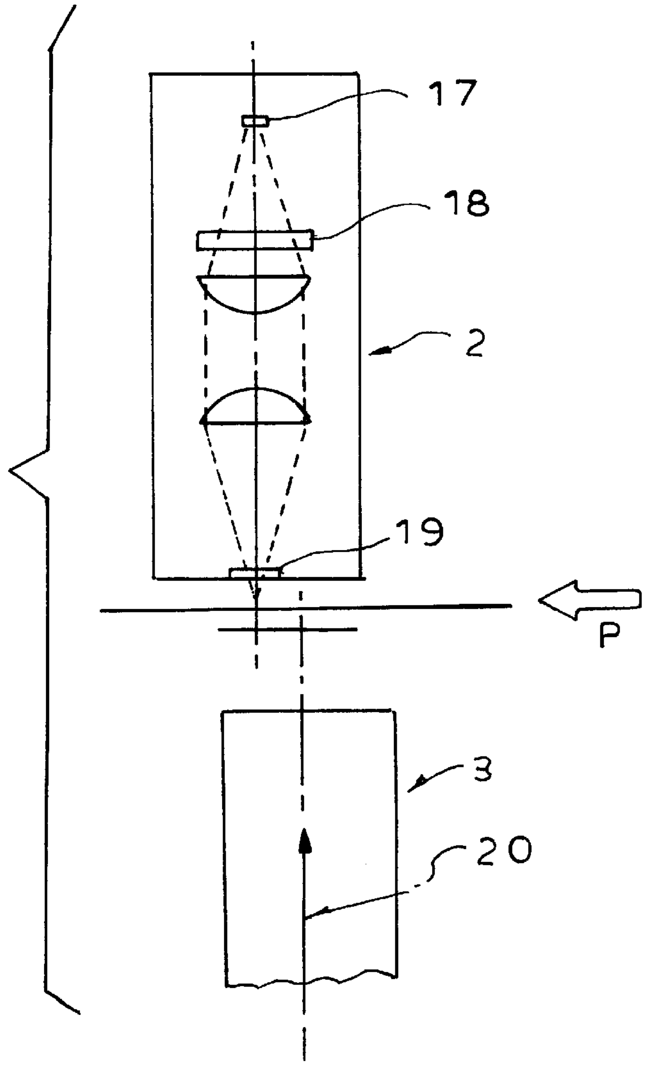
FIG. 6 is a diagram of a further luminescent test device, but for testing in transluminating light.

The test device shown in FIGS. 5 and 6 has at least one receiver 17 for emissions from the luminescent substances provided on the document and at least one source 3 for exciting the luminescent substances. Depending upon the spectral region required and the field use of the test device according to the invention (also for bank note testing in the service industries), the source 3 for exciting the luminescent substances can include a laser, laser diode, luminous diode, luminophor tube, halogen lamp but also X-ray tubes, electron-beam tubes as well as radioactive substances, etc. For the operation the source 3 can be operated with pulse driver when testing in several spectral ranges are to be carried out (thus when a multichannel configuration of the test device is provided). The receiver 17 for the measurement of the emissions of the luminescent substances can be photodiodes, photomultipliers and CCD arrays.

In the embodiments shown in FIGS. 5 and 6, between the document to be tested and the receiver 17, an optical column 2 is arranged. In the beam path of this optical column, ahead of the receiver 17, there is found a filter 18. As the filter 18, for embodiments with polychromatic illumination from the source 3, interference filters, edge band-pass filters or also combinations of such filters can be used. In this manner information is obtainable upon the significant spectral light distribution. Instead of an optical column, between the document and the receiver 17, especially for effecting flat measurements, light-conductive fibers and fluorescent plates can be used. Such fluorescent plates are comprised of transparent plastics in which fluorescent dye molecules are provided and which are excited by the radiation traveling from the document to the receiver 17.

FIG. 6 shows a test device which operates by a through-illumination process, i.e. the receiver and source for irradiation of the luminescent substances are disposed on different sides of the document. The direction of movement of the document in FIGS. 5 and 6 is indicated with P.

From FIG. 6 it is further apparent that in the case that phosphorescent substances are provided as luminescent substances upon the document, between the illumination plane and the intersection between the document to be tested and the optical axis (detection plane) an offset s is provided. This distance can amount for example to 5–10 mm. If the detection plane is approached by around 8 mm to the illumination plane in the direction P of movement of the document, at a document velocity of 8 m/sec, the luminescence measurement of the phosphorescent material is effected with a delay of 1 m/sec. To the extent that several measurement locations are detected on one and the same document, optical scanners capable of deflecting the illumination and the emitted light can be used. As optical scanners, for example, galvanometer mirrors can be employed. Also acousto-optical modulators can be used to deflect the radiation from the radiating device 3.

In order to split the luminescent light in reflected light measurement to a plurality of measuring channels equipped with different filters 18 or also receivers 17, dividing mirrors can be used.

What is claimed is:

1. A banknote comprising:

a carrier of banknote paper bearing banknote indicia and capable of authentication; and a security attribute affixed to said carrier for authenticating said carrier, said security attribute having a foil structure with at least one vapor-deposited metallic stratum responsive to light and forming a light pattern signalling authenticity, a hot-melt adhesive layer bonding said foil structure to said carrier, at least one transparent layer in said foil structure, and at least one luminescent substance doping said adhesive layer in a machine-readable pattern for signalling by luminescence therefrom authenticity of the banknote.

2. The banknote defined in claim 1 wherein said stratum includes at least one of a light-reflecting structure, light-diffracting structure and light-refracting structure.

3. The banknote defined in claim 2 wherein said adhesive layer contains a plurality of different luminescent substances.

4. The banknote defined in claim 3 wherein said luminescent substance is selected from the group which consists of phosphorescent substances, fluorescent substances and mixtures of phosphorescent and fluorescent substances.

5. The banknote defined in claim 4 wherein said luminescent substance is a small-band-luminescent rare earth and said stratum is a hologram.

6. A foil structure for authenticating a laminate and applicable to laminate paper to form a authenticatable banknote, said foil structure comprising:

a carrier film;

a transparent layer on said carrier film;

a hot-melt adhesive layer on said transparent layer for bonding said foil structure to said laminate paper;

at least one luminescent substance doping said adhesive layer in a machine-readable pattern for signalling by luminescence therefrom authenticity of the banknote; and at least one vapor-deposited metallic stratum between said transparent layer and said adhesive layer for providing a machine readable optical pattern.

7. The foil structure defined in claim 6 wherein said stratum is a hologram said transparent layer is formed by a layer of a transparent lacquer, a wax release layer being provided between said carrier film and said transparent layer.

* * * * *